Feb. 14, 1967  E. LAIMINS ETAL  3,303,695
AMBIENT PRESSURE COMPENSATION OF LOAD CELLS
Filed Jan. 13, 1965  2 Sheets-Sheet 1
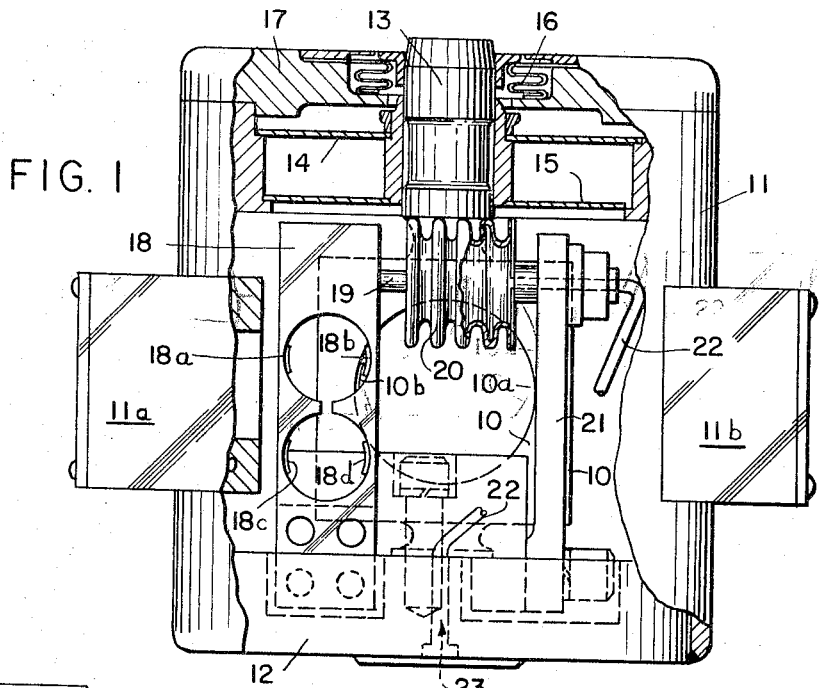
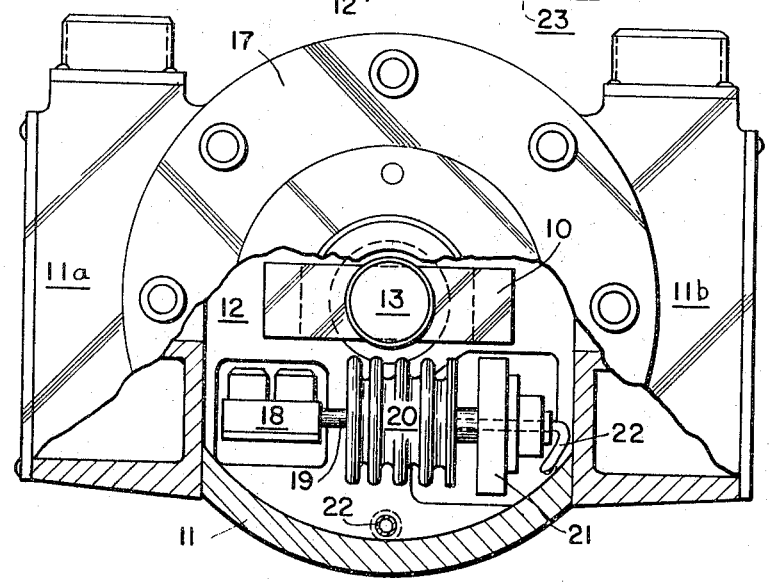
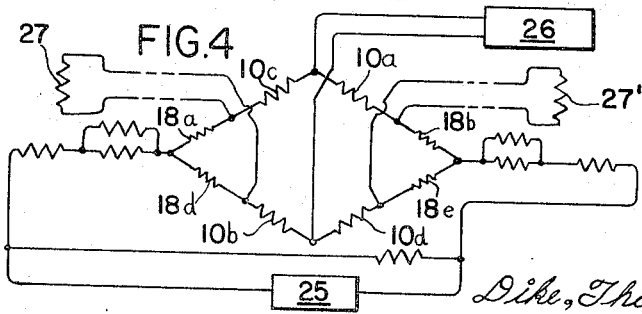
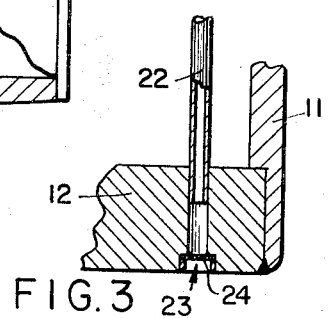
INVENTORS
ERIC LAIMINS
DONALD A. SENOUR
BY
Dike, Thompson, Bronstein & Mrose
ATTORNEYS Feb. 14, 1967  E. LAIMINS ETAL  3,303,695
AMBIENT PRESSURE COMPENSATION OF LOAD CELLS
Filed Jan. 13, 1965

INVENTORS
ERIC LAIMINS
DONALD A. SENOUR
BY
Dike, Thompson, Bronstein & Mrose
ATTORNEYS United States Patent Office 3,303,695
Patented Feb. 14, 1967

3,303,695
AMBIENT PRESSURE COMPENSATION OF
LOAD CELLS
Eric Laimins, Cambridge, and Donald A. Senour, Carlisle, Mass., assignors to BLH Electronics, Inc., Waltham, Mass., a corporation of Delaware
Filed Jan. 13, 1965, Ser. No. 425,162
7 Claims. (Cl. 73—141)

The present invention relates to improvements in the measurement of forces by means of sealed load cells, and, in one particular aspect, to novel and improved force-measuring systems wherein auxiliary barometrically- responsive load cell units are in unique circuit relationships with sealed low-capacity load cells which automatically compensate for pressure-induced errors while maintaining high measurement sensitivity.

It is commonly required that load cells, of the type involving electrical strain gages affixed to surfaces of a housed measuring element stressed by applied loads, be hermetically sealed to avoid corrosion and contamination. In some instances, the same flexible hermetic sealing diaphragms also serve as guides which maintain accurate alignment of the load-responsive measuring elements in relation to supporting enclosures. Differentials between the pressures within the sealed housings and the ambient atmospheric or other fluid (such as liquid, in the case of submerged cells) pressures, are effective to cause the sealing diaphragms to exert forces on the measuring elements which are indistinguishable from the loading to be measured and which are the source of error. These effects are especially troublesome in the case of low-capacity load cells, wherein the errors may be relatively large percentages of the output signals. One earlier-described solution to such problems has involved a special cell design in which there is an auxiliary diaphragm, the forces of which are coupled to the measuring element at a position and in directions which develop a desired mechanical counterbalancing of the main sealing diaphragm. However, in many cases it is preferred that conventional forms of load cells be utilized, and that the pressure-induced errors be eliminated without basic alteration in well-established and commercially popular mechanical structures. In accordance with the present teachings, it now is possible to minimize such errors through unique electrical circuit interconnections of conventional types of load cells with auxiliary load cells, the latter being physically isolated from the former, but preferably disposed within the same housings, while at the same time avoiding substantial losses in measurement sensitivity and advantageously preserving input and output electrical characteristics which permit the same conventional supply and measurement equipment to be used in both compensated and uncompensated systems.

It is one of the objects of the present invention, therefore, to provide novel and improved force-measuring systems wherein errors occasioned by ambient pressure variations are suppressed electrically.

Another object is to provide unique load-cell apparatus including auxiliary pressure-responsive load cell equipment which compensates for ambient pressure fluctuations without involving material changes in basic mechanical and electrical design characteristics.

Further, it is an object to provide improved pressure-compensated load-cell measuring systems wherein the strain gages of main load cells, which preserve high-load are in electrical bridge-circuit relationships, with the strain gages of main load cels, which preserve high-load measurement sensitivity.

By way of a summary account of practice of this invention in one of its aspects, there is provided a generally conventional form of low-capacity load cell wherein a main columnar load-responsive element carrying electrical resistance strain gages is affixed at one end to a base and, at the opposite end, is joined with a base-supported housing by way of a relatively thin flexible sealing diaphragm. Within the same housing there is disposed an auxiliary load-responsive element, mounted on the base, to which a bellows, actuated by differentials between external and internal pressures, applies loads characterizing the ambient pressure variations relative to the internal pressures at any time. The auxiliary load-responsive element is likewise equipped with electrical resistance strain gages, which are selected to be of resistance relatively low in comparison with those associated with main load-responsive elements, and both sets of strain gages are connected within a single bridge circuit in a manner which promotes high load-measurement sensitivity (i.e. the bridge is highly responsive to variations in resistance of the gages associated with the main load-responsive element).

Although the aspects of this invention which are believed to be novel are set forth in the appended claims, additional details as to preferred practices of the invention and as to the further objects, advantages and features thereof may be most readily comprehended through reference to the following description taken in connection with the accompanying drawings, wherein:

FIGURE 1 is a side view, with portions broken away to expose internal constructional details, of an improved pressure-compensated low-capacity load cell arrangement;

FIGURE 2 presents a plan view of the same arrangement, with portions broken away to expose internal constructional details;

FIGURE 3 is a cross-sectioned fragment of the structure of FIGURES 1 and 2, showing a connection for communicating ambient pressures into a sealed bellows actuator for a pressure-responsive cell;

FIGURE 4 provides a schematic diagram of the consolidated gaging network including strain gages of both a main load cell and an auxiliary pressure-compensation cell;

Figure 8:
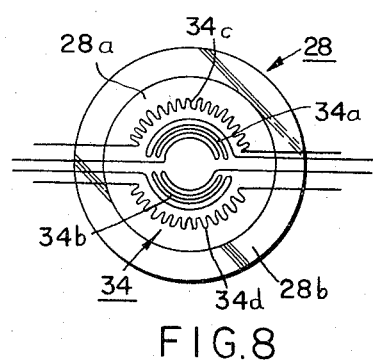

FIGURE 8 views the same auxiliary pressure cell, from below; and

Figure 9:
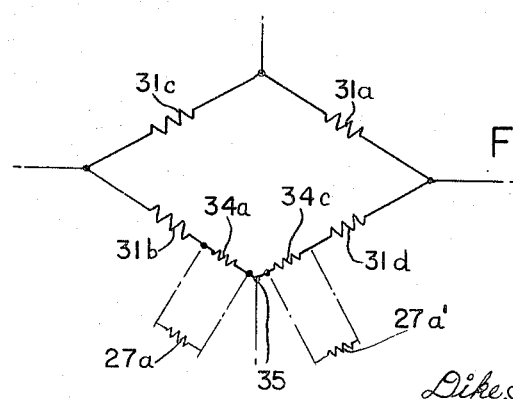

FIGURE 9 provides a schematic representation of part of an alternative consolidated gaging network including strain gages associated with both a main load cell and an auxiliary pressure cell.

The assembly depicted in FIGURES 1 and 2 is that of a hermetically-sealed low-capacity load cell which, absenting any special compensation provisions, is inherently susceptible to errors caused by ambient pressure conditions, either of the atmosphere or other surrounding fluid. A known form of ring-type strain-sensitive element 10 is there shown disposed centrally of a hollow cylindrical casing 11, with one end being secured to a circular base 12 which is welded to the casing, and with the other relatively free end, 13, being held laterally in alignment within the casing by a pair of spaced annular diaphragms 14 and 15. Commonly, the upper diaphragm alone suffices to provide all of the sealing needed for such a load cell unit, although the particular unit which has been illustrated also further includes a small flexible sealing bellows 16 supported between a cover element 17 and the end 13 of the strain-sensitive element. During manufacture, such units are conventionally flushed with a dry gas, such as nitrogen, and are sealed either with a fill of the gas or in a partially evacuated state. In either event, the flexible seals experience differentials of pressure, between pressures within the interior of the casing and pressures of the ambient environment, which cause them to impose unwanted forces on the relatively free ends of the load-sensitive elements. Of the four electrical resistance strain gages associated with the ring-type element 10, only two (10a and 10b) are visible in FIGURE 1; such gages respond to the ring stresses without having the ability to discriminate between unwanted forces resulting from the aforesaid pressure differentials and from the externally-applied load forces which they are intended to measure. These unwanted forces may either substract from or add to those of the load under measurement. The seriousness of the resulting errors may be appreciated by considering the example of a 500-lb. capacity load cell having a sealing diaphragm and free end which have an externally-exposed diametric span of but three and one-half inches; an ambient pressure variation of one atmosphere (15 p.s.i.) results in a 112.5-lb. change in loading, and is equal to a full-scale error of 22.4%. A reduction to less than 0.1% full scale error is sought. Submerged units may be exposed to even greater ambient pressure variations. Temperature-induced internal changes in entrapped-gas pressure likewise tend to develop errors of the same general character, and, although temperature-compensating impedances may be used for corrective purposes, it is desirable that these be consigned only to the different task of compensating for electrical-circuit changes with temperature.

The desired corrections are obtained by incorporating a pressure-responsive cell physically into the load cell unit, where it responds to the same internal and external pressures and to the same temperature conditions, and where electrical interconnections can be made conveniently and without introducing unwanted impedances. For these purposes an auxiliary strain-sensitive element 18 is at one end rigidly affixed to base 12 and, at the other, is connected with the movable output member 19 of a bellows capsule unit 20. The opposite side of the bellows capsule is held fixedly in relation to the base 12 by a bracket 21. Ambient external pressures are communicated to the interior of the sealed bellows capsule by a tube 22 which projects through an opening 23 in the base 12 (FIGURE 3) and is isolated from contaminants by a screening 24. Increases and decreases in external pressure, relative to the internal pressure within the casing, cause the bellows capsule to expand and contract and thereby deflect the element 18 in the manner of a cantilever beam. Strain gages 18a–18d are disposed at sites of high stress within the joined circular openings in that element, and respond to tension and compression effects at these sites. The normal resistance values of these gages are selected to be small in relation to the resistances of the four strain gages associated with the main load-sensitive element 10 of the unit; this relationship is established so that the sensitivity of measurements by the main gages will not be substantially affected by their being in circuit with the gages of the auxiliary sensing element, while at the same time permitting the latter gages to undergo such relatively large resistance excursions with strain as will correct for unwanted pressure-induced changes in the resistances of the main strain gages. In one typical example, each of the four strain gages 10a–10d (FIGURE 4) affixed to the main load-sensing element normally has an unstrained resistance of about 350 ohms, and the auxiliary gages 18a–18d, which are responsive only to the differential pressures, each has a resistance of but about 18.8 ohms. Beam element 18 and the bellows unit 20 are designed routinely to develop the relatively high levels of strain which will yield the degree of resistance changes in gages 18a–18d, needed to offset the unwanted pressure-induced changes in the resistances of the main load-sensing gages.

A preferred electrical network arrangement for the two sets of gages is shown in FIGURE 4 as comprising essentially a single bridge in which each of the four main load-sensing gages 10a–10d is in series with a different one of the four auxiliary gages, 18a–18d, in a different one of the usual four bridge arms. D.C. power supply 25 excites the bridge across the bridge input terminals, and a conventional type of measuring instrument 26 responds to the electrical output signals developed across the opposite set of bridge terminals; the usual modulus gages, modulus gage shunts, calibration resistances, and a terminal resistance adjustment resistance are also illustrated. Compensation resistance shunts 27 and 27' are connected between those ends of each pair of the auxiliary gages which are opposite to their ends joined in common with a bridge input terminal; these shunts are disposed outside the hermetically sealed casing 11, preferably within the connector housing 11a and 11b (FIGURES 1 and 2), where appropriate values of resistance may be inserted without disturbing the sealing as each device is tested empirically during manufacture, to insure that the levels of ambient pressure compensation are within desired limits for each unit. In each arm of the bridge, the pressure-responsive changes in resistance of a strain gage on the main load-sensing element are effectively offset by substantially equal and opposite bridge-unbalancing changes in resistance of that bridge arm as effected by a strain gage associated with the auxiliary force-sensing element 18. The latter element is mounted such that it is mechanically fully isolated from the main load measured by the unit, and is only responsive to the same internal and external pressures, including temperature-induced variations in the internal pressures. Interconnections between the main and auxiliary gages must be kept of short predetermined length and resistance and free from pick-up of interference signals, and this is promoted by their fixed proximity within the same casing. In addition, two important advantages are realized by proportioning the auxiliary gage resistances such that they are normally small in relation to those of the main strain gages: first, the overall bridge sensitivity is preserved at a high level, by minimizing the effects of bridge arm resistances which are passive as to changes in the measured load; and, second, the characteristic impedances of the bridge are not materially altered from what they would be without the pressure-compensating gages, and the same standardized power supplies and measuring instruments may thus be used interchangeably with compensated and uncompensated units. Integration of the two sets of gages into a single bridge has the further important advantage that only a single power supply is used.

Figure 5:
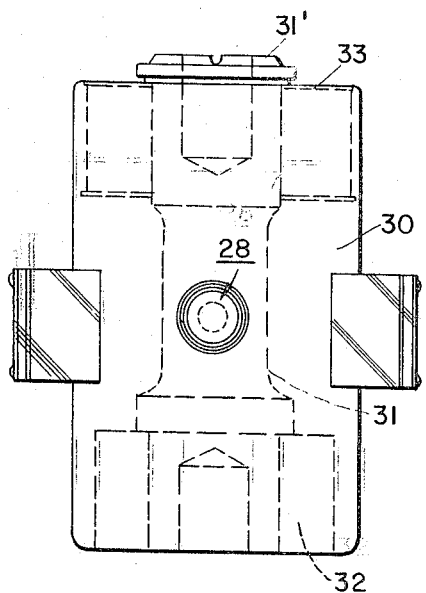
FIGURE 5 is a side view of an alternative embodiment of pressure-compensated load cell, certain of the housed elements being designated by dashed linework.
Figure 6:
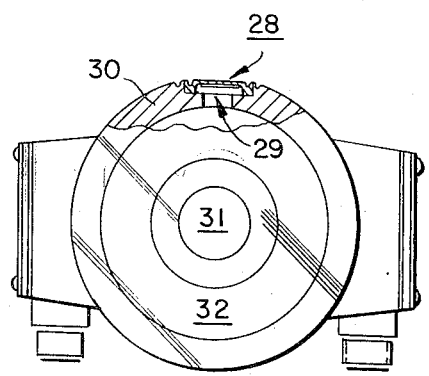
FIGURE 6 depicts the cell of FIGURE 5 from the bottom, and is broken away in part to expose details of an auxiliary pressure cell in the side wall.
Figure 7:
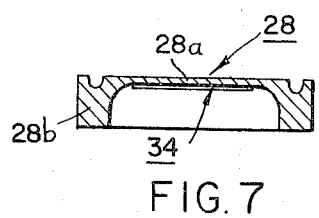
FIGURE 7 is an enlarged cross-sectioned side view of the auxiliary pressure cell shown in FIGURE 6.

It is not essential that a bellows-type pressure-responsive element be employed for the ambient pressure compensation, nor that the associated sensing element be of the cantilever form discussed thus far. In another preferred construction, illustrated in FIGURES 5 and 6, the auxiliary pressure-responsive unit combines these functions in a diaphragm-type auxiliary pressure-responsive cell 28 which is fitted into and sealed (welded) into a side aperture 29 in a cell unit casing 30. The main load-sensing element, 31, is there shown mounted at one end on a base 32 which is sealed with the casing, and the upper diaphragm 33 of a spaced pair of lateral-support diaphragms maintains a fluid-tight seal between the casing and the relatively free upper end 31' of the main sensing element. As appears from an inspection of FIGURES 7 and 8, the auxiliary cell unit is of a particularly simple form wherein the flexible diaphragm portion 28a, centrally of the stiff annular rim 28b, constitutes both the sealing and stress-responsive element. Strain gages 34 are affixed to the inner surfaces of the diaphragm; these may conveniently comprise a pair of arcuately-extending tension gages, 34a and 34b, and a pair of sinuous radiallyextending compression gages, 34c and 34d. These gages may be of foil or printed-circuit constructions, and are preferably interconnected with the main load-responsive strain gages (not shown) associated with element 31 in the manner illustrated in FIGURE 4. Alternatively, another number of auxiliary gages than four may be used, the arrangement in FIGURE 9 being illustrative of the integration of two of the relatively low-resistance gages, 34a and 34c in a bridge circuit relationship with gages 31a–31d of the main load-sensing element 31. The latter gages correspond to the gages 10a–10d in FIGURE 4. Auxiliary tension and compression gages 34a and 34c are each in series with the main gage resistance in a different one of adjacent bridge arms which are joined at one of the two output terminals, and their changes in resistance with pressures across cell 28 are proportioned to introduce output signal corrections which offset the pressure-induced changes in resistance of all of the main strain gages 31a–31d. Remote shunts 27a and 27a' serve purposes similar to those of compensation shunts 27 and 27' in FIGURE 4, and are similarly located. Other suitable network arrangements of the main and auxiliary gages may also be devised in accordance with these teachings.

It should be understood that the specific embodiments and practices herein described have been presented by way of disclosure rather than limitation, and that various modifications, substitutions and combinations may be effected without departure in spirit or scope from this invention in its broader aspects.

What we claim as new and desire to secure by Letters Patent of the United States is:

1. Hermetically-sealed load cell apparatus compensated for effects of fluid pressure variations, comprising a load-responsive element having one load-transmitting end fixed in relation to a housing and another load-transmitting end movable in relation to said one end and sealed in relation to said housing by way of a flexible sealing member, a pressure-responsive unit sealed in relation to said housing and including means deformable in response to differences between fluid pressures within said sealed housing and ambient fluid pressures external to said housing, main strain gage means responsive to surface strains exhibited by said load-responsive element, auxiliary strain gage means responsive to surface strains exhibited by said deformable means, said auxiliary strain gage means exhibiting predetermined variations in electrical characteristics with changes in said differences in fluid pressures, and said main gage means exhibiting predetermined variations in electrical characteristics with changes in said differences in fluid pressures, and means interconnecting said main and auxiliary strain gage means in an electrical circuit relationship wherein said variations in electrical characteristics thereof are mutually substantially offsetting with changes in said differences in fluid pressures and wherein substantially the only net changes in electrical characteristics thereof are those of said main strain gage means with changes in other forces applied between said ends of said load-responsive element.

2. Hermetically-sealed load cell apparatus compensated for effects of fluid pressure variations, as set forth in claim 1, wherein said interconnecting means connects said main strain gage means in a measurement bridge circuit relationship, and wherein the impedance of said auxiliary strain gage means is proportioned to be low in relation to impedance of said main strain gage means, whereby the impedance characteristics of said bridge circuit are substantially those developed by said main stream gage means and the sensitivity of said bridge circuit is substantially governed by said main strain gage means.

3. Hermetically-sealed load cell apparatus compensated for effects of fluid pressure variations, as set forth in claim 2, wherein said housing has an opening therethrough communicating the interior of said housing with the exterior thereof, and wherein said pressure responsive unit includes flexible means having a first portion fixed in relation to said housing and sealing the opening in said housing and a second portion which is movable in relation to said first portion in response to changes in the differentials between pressures internal to and external of said housing.

4. Hermetically-sealed load cell apparatus compensated for effects of fluid pressure variations, as set forth in claim 3, wherein said deformable means comprises a force responsive element having one part fixed in relation to said housing and another part fixed in relation to said second movable portion of said flexible sealing means.

5. Hermetically-sealed load cell apparatus compensated for effects of fluid pressure variations, as set forth in claim 3, wherein said second portion of said flexible sealing means comprises a diaphragm having an external surface exposed to fluids external to said housing and an internal surface exposed to the interior of said housing, said auxiliary strain gage means being mounted on said internal surface of said diaphragm for response to surface strains exhibited thereby.

6. Hermetically-sealed load cell apparatus compensated for effects of fluid pressure variations, comprising a housing, a load-responsive element having one load-transmitting part fixed in relation to said housing and another load-transmitting part movable in relation to said one part, flexible sealing means sealing said other load-transmitting part with said housing, said housing having an opening therethrough communicating the interior of said housing with the exterior thereof, flexible pressure-responsive means sealing the opening through said housing and including means elastically deformable in response to changes in differences between fluid pressures within and external to said housing, a plurality of main electrical strain gages within said housing responsive to surface strains exhibited by said load-responsive element, auxiliary strain gages within said housing responsive to surface strains exhibited by said deformable means, said auxiliary strain gages exhibiting electrical impedances low in relation to the electrical impedances of said main strain gages, means connecting each of said main strain gages in a different arm of a measurement bridge circuit with at least one of said auxiliary strain gages in series with one of said main strain gages in at least two of the arms of said bridge circuit, said main and auxiliary strain gages which are in series in each of said arms having impedances which vary in opposite senses in response to surface strains to which they are exposed upon occurrence of the same pressure differences between the interior and exterior of said load cell apparatus.

7. Hermetically-sealed load cell apparatus compensated for effects of fluid pressure variations as set forth in claim 6, wherein said connecting means connects four of said main strain gages each in a different arm of said bridge circuit and each in series with a different one of four of said auxiliary strain gages within said housing, and wherein each of said auxiliary strain gages varies in impedance by substantially the same amount as and in a sense opposite to the impedance variations of the main strain gage in series therewith upon occurrence of predetermined changes in said pressure differences.

References Cited by the Examiner

UNITED STATES PATENTS

| | | | |
|---|---|---|---|
| 2,336,500 | 12/1943 | Osterberg | 73—141 |
| 2,639,616 | 5/1953 | Tate | 73—393 |
| 3,168,826 | 2/1965 | Paetow | 73—141 |

RICHARD C. QUEISSER, *Primary Examiner.*

C. A. RUEHL, *Assistant Examiner.*